Dec. 5, 1961 T. F. NELSON ET AL 3,011,683
BEVERAGE DISPENSER
Filed April 28, 1959 3 Sheets-Sheet 1

Inventors:
Thomas F. Nelson,
James A. Ottinger,
by Laurence R. Kempton
Their Attorney.

Dec. 5, 1961   T. F. NELSON ET AL   3,011,683
BEVERAGE DISPENSER
Filed April 28, 1959   3 Sheets-Sheet 2
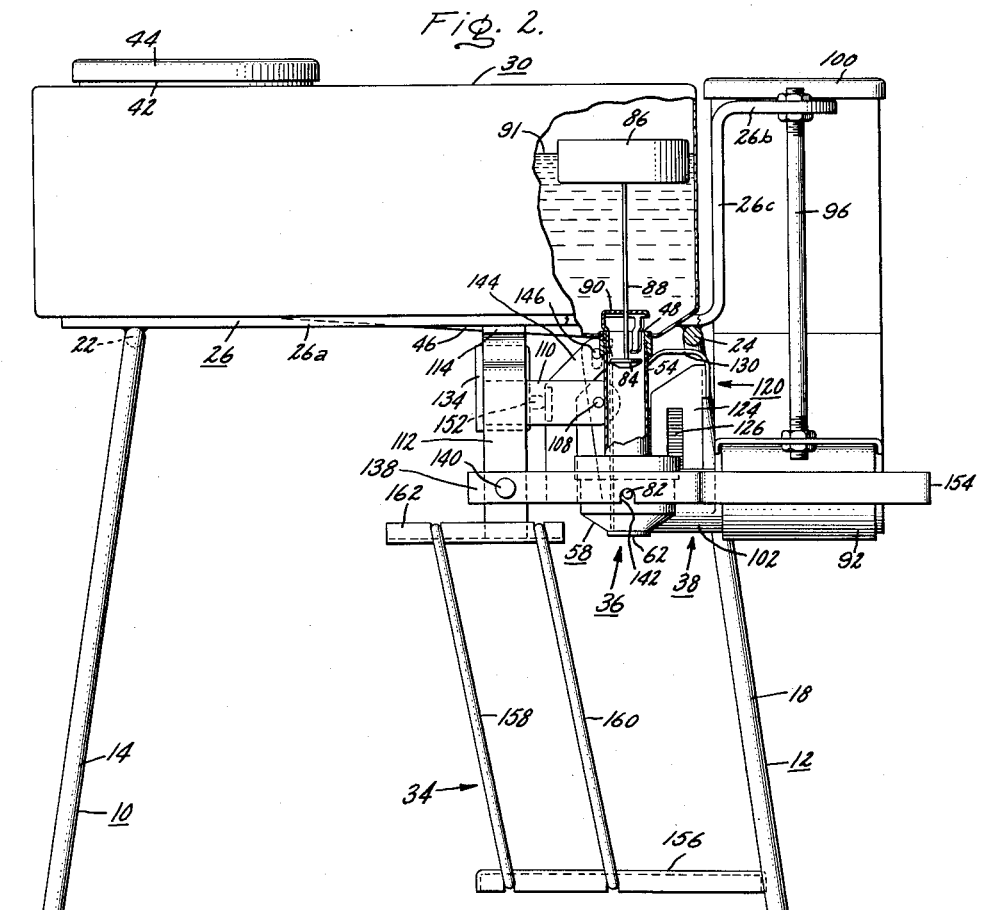
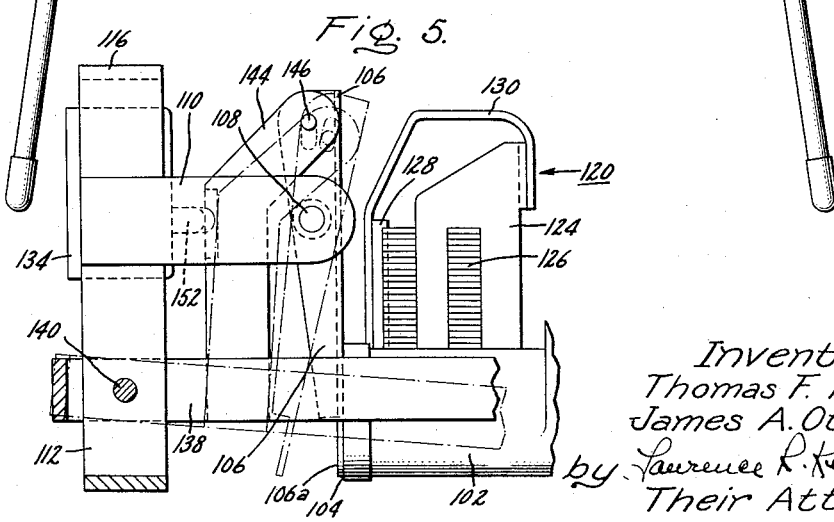
Inventors:
Thomas F. Nelson,
James A. Ottinger,
by Laurence R. Kempton
Their Attorney.

Dec. 5, 1961  T. F. NELSON ET AL  3,011,683
BEVERAGE DISPENSER

Filed April 28, 1959  3 Sheets-Sheet 3

Inventors:
Thomas F. Nelson,
James A. Ottinger,
by Lawrence R. Kempton
Their Attorney

United States Patent Office 3,011,683
Patented Dec. 5, 1961

3,011,683
BEVERAGE DISPENSER
Thomas F. Nelson, Stratford, Conn., and James A. Ottinger, Allentown, Pa., assignors to General Electric Company, a corporation of New York
Filed Apr. 28, 1959, Ser. No. 809,387
7 Claims. (Cl. 222—133)

This invention relates to a portable beverage dispenser for domestic use adapted for automatic brewing, on demand, of so-called "instant" beverages in which soluble powders are mixed with water. More particularly, the invention relates to a beverage dispenser adapted to release water and powdered coffee or the like in predetermined ratios into a cup or any other receptacle. When in use, the dispenser maintains a fixed flow of one of the ingredients and a constant though adjustable flow of the other, and thus the strength of the beverage may be varied from time to time by manual adjustment to suit individual tastes, and yet for each adjustment the strength remains constant while the beverage is being dispensed, regardless of the quantity of beverage dispensed in any given operation.

The most desirable dispensers of beverages such as coffee are those which brew on demand, that is, at a given time they brew only so much as is required to be dispensed at that time. This eliminates the requirement for a separate tank to hold the brewed beverage until it is dispensed, with the beverage going stale when there is a long interval between brewing and dispensing. This feature is of particular importance in applications in which the amount of beverage required cannot readily be estimated in advance.

One alternative has been to brew by hand, with soluble or instant beverages, the exact amount required to be dispensed at a given time. However, even in domestic applications, it is desirable to brew a beverage such as coffee automatically; in commercial applications automatic brewing is, of course, a highly important feature. Of the automatic brewers which have enjoyed commercial success, none are capable of true demand brewing for all quantities which one may desire to dispense at a given time. Furthermore, most of the designs for restaurants, etc., are too bulky and costly for use in homes and the smaller business establishments.

Accordingly, it is a principal object of our invention to provide an improved beverage dispenser adapted to brew and dispense on demand a soluble type beverage, such as instant coffee. For practical use in the home, the dispenser should be capable of lightweight, portable construction so as to be readily movable to any location which the user may desire. It should not require direct connection to water supply lines. Commercial applications dictate rugged, trouble-free design coupled with minimum space utilization. Practical design also requires minimum upkeep in the way of washing, etc. The objects of the invention also include the provision of a beverage dispenser of the above character which is economical in operation and, in particular, wastes none of the various ingredients used therein. The dispenser should, of course, be susceptible of low cost construction. Other objects of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

For a fuller understanding of the nature and objects of the invention, reference should be had to the following detailed description taken in connection with the accompanying drawings, in which:

FIG. 2 is a side view of the apparatus shown in FIG. 1, partly broken away to disclose the liquid feed mechanism;

FIG. 5 is a fragmentary enlarged side view, similar to FIG. 2, showing in detail the powder feed mechanism and associated operating linkage of the apparatus.

In general, a beverage dispenser incorporating the features of our invention includes separate reservoirs for water and for the water soluble powder to be combined therewith. The apparatus delivers the separate ingredients directly to a cup or other receptacle supplied by the user, and the brewing takes place in the receptacle. The user depresses an operating lever which causes a simultaneous and continuous flow of water and powder into the receptacle so long as desired, and release of the operating lever cuts off such flow. The rates of flow of the ingredients are maintained constant by mechanisms to be described, and therefore with such continuous and constant delivery of the ingredients, the ratio thereof remains the same and the strength of the beverage is kept at the desired point regardless of the quantity of materials drawn from the dispenser at any given time. In other words, the user may draw a demitasse cup, a full cup, a potful, or such other amount as may be desired, and the beverage will not only be brewed on demand with the advantages enumerated above, but the strength will remain the same.

Provision is also made for changing the rate of flow of one of the ingredients so that the strength of the beverage may be altered to suit one's taste. Thus, if successive cups are drawn for various individuals who desire different strengths, the flow rate of one of the ingredients, powder in the preferred embodiment, may be changed to suit each individual. Another important feature results from the fact that the ingredients never combine in the dispenser itself, thereby minimizing the need for washing of the unit and virtually eliminating the requirement of flushing operations.

Figure 1:
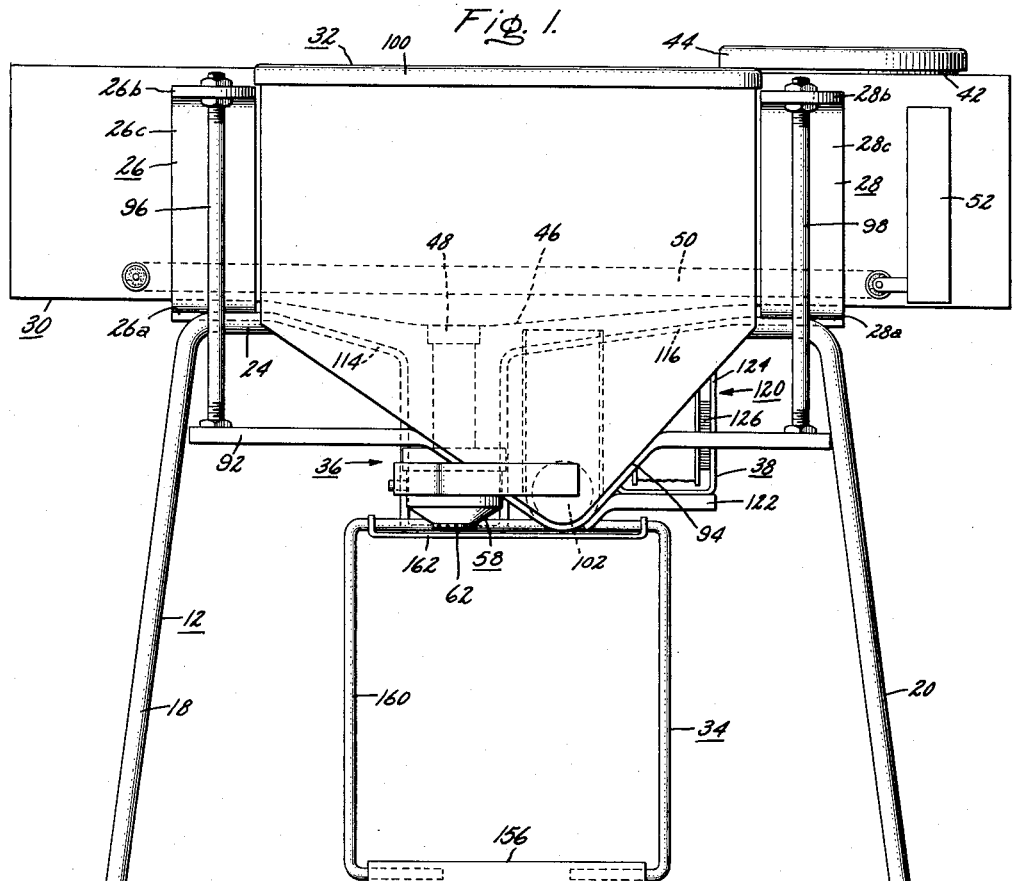
FIG. 1 is a front view of a beverage dispenser made according to our invention.
Figure 6:
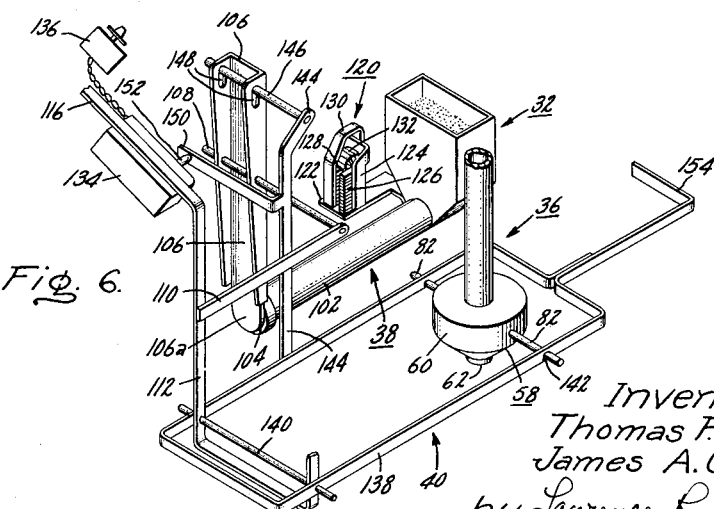
FIG. 6 is a perspective view, with certain dimensions exaggerated for the purposes of clarity, showing schematically the operating linkage and associated parts of the dispenser.

Referring now in greater detail to the drawings, wherein like reference characters identify corresponding parts in the several figures, our beverage dispenser, as shown in FIGS. 1 and 2, is supported on a framework including U-shaped leg members generally indicated at 10 and 12, respectively. Members 10 and 12 comprise legs 14, 16, 18 and 20 joined by horizontal bars 22 and 24. The bars 22 and 24, which may be formed integrally with the leg extensions as shown, are welded to the lower horizontal portions 26a and 28a of a pair of brackets 26 and 28. A liquid reservoir generally indicated at 30, a powder reservoir generally indicated at 32, and a receptacle support generally indicated at 34 and disposed below the reservoirs are all supported by the brackets 26 and 28 in a manner to be described. A liquid feed mechanism generally indicated at 36 and a powder feed mechanism generally indicated at 38, adapted to dispense liquid and powder from the reservoirs 30 and 32, respectively, are disposed above the receptacle support 34. As best seen in FIG. 6, operating linkage generally indicated at 40 is interconnected with the feed mechanisms 36 and 38 to control their operation in a manner to be described.

Figure 3:
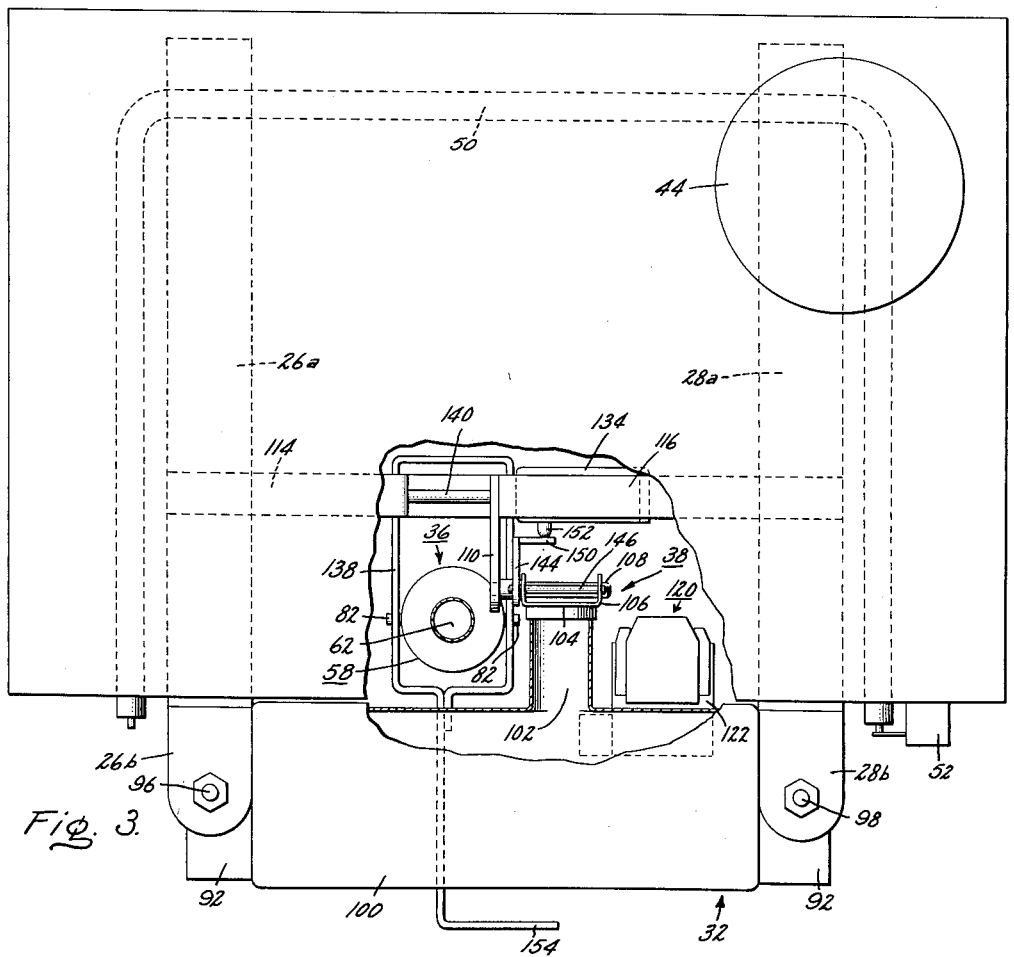
FIG. 3 is a top view of the dispenser shown in FIGS. 1 and 2, partly broken away to show the physical relation of the liquid feed and powder feed mechanisms.

Still referring to FIGS. 1 and 2, the liquid reservoir 30 rests on and is suitably secured to the lower horizontal portions 26a and 28a of the brackets 26 and 28. Reservoir 30 is provided with a filler hole 42 (FIG. 3) over which is fitted a cap 44. The bottom 46 of the liquid reservoir slopes downwardly toward an outlet 48 disposed above the receptacle support 34. The reservoir 30 is also provided with a heating element 50 (FIGS. 1 and 3) controlled by a thermostatic switch 52 adapted to maintain at a desirable temperature a liquid such as water stored in the reservoir.

Figure 4:
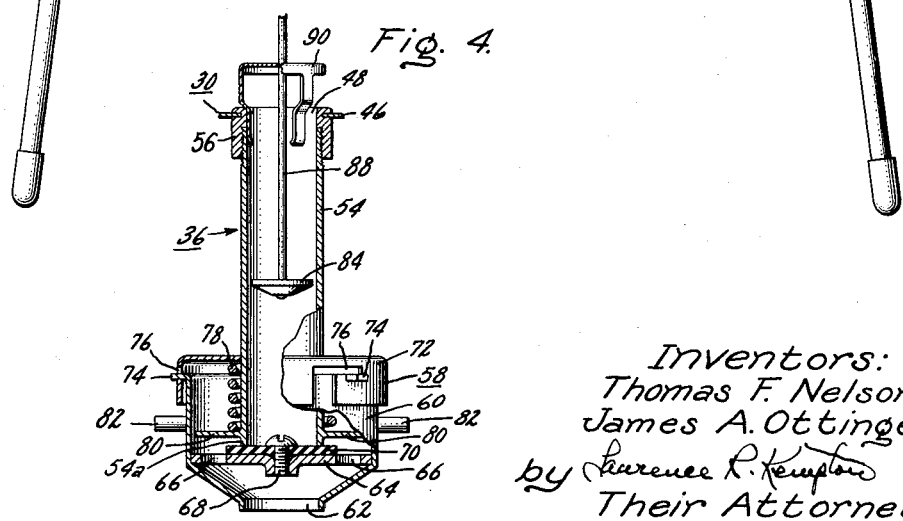
FIG. 4 is an enlarged front view, partly in section, of the liquid feed mechanism contained within the dispenser.

Turning now to FIG. 4, the liquid feed mechanism 36 includes a vertically oriented tube 54 threaded into a bushing 56 suitably secured in the outlet 48 of the liquid reservoir 30. The mechanism 36 also includes a valve generally indicated at 58 and flow regulating means to be described. The valve 58 includes a casing 60 at the lower extremity of which is an outlet 62. A plate 64 extending across the interior of casing 60 is provided with a plurality of apertures 66 and is threaded to accommodate a screw 68 which positions a gasket 70 thereon.

Still referring to FIG. 4, the valve 58 is provided with a cap 72 secured to the casing 60 by a twist-lock arrangement comprising detents 74 on the casing interfitting with L-shaped slots 76. A compression spring 78, extending between the cap 72 and a flange 80 affixed to the tube 54 adjacent its lower end 54a, urges the casing 60 upwardly to maintain closure of the tube 54 by the gasket 70. The force exerted by the spring 78 also serves to maintain the cap 72 in its locked position on the casing, as illustrated in FIG. 4. A pair of lugs 82 suitably affixed to the valve casing 60 are utilized in operating the valve 58 in a manner to be described.

As best seen in FIGS. 2 and 4, a flow regulating constriction disk 84 disposed within the tube 54 is suspended from a float 86 by a shaft 88. A guide 90 in the upper end of the tube 54 ensures proper alignment of the disk 84 and associated parts and also serves to prevent the disk from leaving the tube 54 when the dispenser is moved, inverted, etc. It will be noted that the disk 84 bears a fixed relationship to the surface of the liquid in reservoir 30, since, as the surface 91 (FIG. 2) of the liquid in this reservoir moves downwardly on withdrawal of the liquid, the float 86 supporting the disk 84 descends the same distance.

Operation of the liquid feed mechanism 36 is effected by depressing the lugs 82 in a manner to be described, thereby to move the casing 60 downwardly against the force of the compression spring 78 and space the gasket 70 from the lower end 54a of the tube 54. The liquid then moves downwardly under the force of gravity, through the tube 54, over the gasket 70, through the apertures 66 and thence downwardly through the outlet 62 to descend by gravity into a suitable receptacle (not shown) on the receptacle support 34. Upon releasing the downward pressure on the lugs 82, the spring 78 forces the casing 60 upwardly to return the gasket 70 to the closed position against the tube 54.

The liquid flow path beneath the disk 84, i.e., through the lower portion of tube 54, over gasket 70, and through apertures 66 and outlet 62, presents substantially less resistance to flow than the comparatively narrow annular space between the periphery of the disk and the inner wall of the tube 54. Accordingly, the flow of liquid from the reservoir 30 is dependent almost entirely on the pressure at the constricting disk 84. This pressure, in turn, depends on the head of liquid above the disk, which is maintained constant by the float 86. Accordingly, the liquid flow through the feed mechanism 36 is constant regardless of the amount of liquid remaining in the liquid reservoir 30.

Turning once again to FIGS. 1 and 2, the powder reservoir 32 is supported from tab portions 26b and 28b on the upper ends of vertical portions 26c and 28c of the brackets 26 and 28. The supporting arrangement includes a channel-shaped bracket 92 conforming to the bottom 94 of the reservoir 32 and a pair of bolts 96 and 98 by which the bracket 92 is suspended from the tab portions 26b and 28b. A cover 100 is fitted over the top of the reservoir 32. As best seen in FIG. 1, the bottom 94 of the reservoir 32 slopes sharply downwardly toward the powder feed mechanism 38 to facilitate the flow of powder thereto.

Turning now to FIG. 6, the powder feed mechanism 38 is provided with a tube 102 communicating with the interior of the reservoir 32 at the lowest point thereof. The tube 102 has an outlet 104 disposed adjacent the outlet 62 of the liquid feed mechanism (FIG. 3), and the outlet 104 is sealed by the lower end 106a of a gate 106. Gate 106 is pivotally mounted for rotation on a shaft 108 supported by an arm 110. The arm 110, in turn, is fastened to a U-shaped bracket 112 whose upper outwardly extending arms 114 and 116 are preferably welded to the horizontal portions 26a and 28a of the brackets 26 and 28 (FIG. 1).

Still referring to FIG. 6, the powder feed mechanism 38 is provided with a vibrator generally indicated at 120. The vibrator 120 is preferably mounted on a plate 122 (FIGS. 1 and 6) welded to the bracket 92 adjacent the tube 102 and the lowest part of the powder reservoir 32. Vibrator 120 includes a frame 124 enclosing a U-shaped stack 126 of suitable magnetic laminations. An armature 128 (FIG. 5) is supported adjacent the ends of the stack 126 upon a flexible spring armature support 130 the opposite end of which is secured to the frame 124. Frame 124 is mounted upon plate 122, as shown in FIG. 6. A coil 132 formed around the stack 126 is preferably connected in series with a switch 134 and a rheostat 136.

When the switch 134 is closed in a manner to be described to connect the coil 132 to an alternating current source, the stack 126 exerts alternating magnetic force upon the armature 128, causing it to oscillate between the open ends of U-shaped stack 126 at a rate of twice the supply frequency, e.g., twice 60 cycles or 120 times per second. This produces vibrations in the armature support 130, which are transmitted along plate 122 and through the bracket 92 to the bottom 94 of the reservoir 32 and also to the tube 102. The vibrations thus transmitted cause the tube 102 to oscillate in a short arc about an axis extending horizontally through the upper ends of supporting bolts 96 and 98 so as to propel the powder in reservoir 32 and tube 102 toward the outlet 104 in a well-known manner. Because of the rapidity of the vibrations, the flow of the powder is substantially continuous. The amplitude of the vibrations is controlled by the rheostat 136 which limits the current to the coil 132. Manipulation of the rheostat 136, which may be mounted on an outer casing or front panel (not shown), regulates the rate at which the powder is dispensed from the outlet 104 and thereby regulates the strength of the brewed beverage. The mounting rods 96 and 98 are sufficiently resilient in the direction of the vibrations of the vibrator 120 in order to confine the vibrations to the powder reservoir 32 and powder feed mechanism 38 and also to minimize transmission of vibrator hum through other parts of the dispenser to the surrounding atmosphere.

As best seen in FIG. 6, the operating linkage 40 includes a frame 138 pivoted on a shaft 140 extending through the bracket 112. Frame 138 is provided with notches 142 accommodating the lugs 82 of the valve 58. An arm 144 extending upwardly from the frame 138 carries a shaft 146 extending through slots 148 in the gate 106. A lateral extension 150 attached to the arm 144 engages a plunger 152 of the switch 134. An operating lever 154 extending to the front of the unit from the frame 138 (FIGS. 3 and 6) provides for control of the dispenser in a manner to be described.

Referring now to FIGS. 1 and 2, the receptacle support 34 is provided with a platform 156 disposed below the liquid and powder outlets 62 and 104. Platform 156 is supported by a pair of hangers 158 and 160 depending from a flange plate 162 welded to the bottom of the bracket 112. A cup or other receptacle may thus be placed on the platform 156 beneath the liquid and powder outlets for dispensation of the beverage ingredients therefrom upon manipulation of the operating lever 154 in a manner to be described. Both the platform 156 and plate 162 are notched to form pivotal connections with the hangers 158 and 160. The support 34 may be spring loaded by a suitable mechanism (not shown) to maintain the platform 156 in the illustrated position. When it is desired to dispense the beverage into a receptacle too large to fit on the platform, the latter may be moved rearwardly of the dispenser against the spring loaded mechanism to permit the receptacle to be placed directly beneath the outlets 62 and 104.

The operation of the dispenser will now be described with reference to FIG. 6. The operating lever 154 is depressed to swing the frame 138 downwardly about the shaft 140. This depresses the lugs 82 to open the valve 58 in the manner described above (in reference to FIG. 4), thereby effecting a regulated flow of liquid from the outlet 62. Simultaneously, the rotation of frame 138 swings the arm 144 secured thereto to the right (FIG. 6) and thereby rotates the gate 106 about shaft 108 to the dotted line position of FIG. 5, thereby opening the outlet 104. At the same time, the extension 150 moves away from the switch 134 to release the plunger 152 and close the switch. This turns on the vibrator 120. Thus, the liquid feed mechanism 36 and powder feed mechanism 38 begin operation at the same time and continue to run concurrently, dispensing liquid and powder into a common receptacle underneath.

Moreover, as pointed out above, the ingredients flow at rates independent of the contents of the respective reservoirs 30 and 32. Accordingly the proportions of the ingredients dispensed are independent of the amount drawn from the dispenser. These proportions, and thus the strength of the brewed beverage, may be controlled at a desired level by suitable manipulation of the rheostat 136. Also, only a small proportion of the powder dispensed flows into the receptacle at any given time, and this factor, combined with the turbulence caused by the fall of the liquid into the same receptacle, provides a complete mixing of the ingredients and solution of the powder in the liquid. By turning the rheostat 136 to its "off" position, whereby the vibrator 120 is rendered completely inoperative, the apparatus of the invention may be used to dispense hot liquid only.

Referring again to FIG. 6, the dispensing action is terminated by releasing the lever 154. The spring 78 (FIG. 4) in the valve 58 then forces the valve casing 60 and lugs 82 upwardly to close the valve and return the frame 138 to its original position. Movement of the frame results in corresponding motion of the arm 144 to rotate the gate 106, whose lower end 106a once more seals the powder outlet 104. The extension 150 engages the plunger 152 to open the switch 134 and turn off the vibrator 120.

The advantages of our novel beverage dispenser will be immediately apparent. The user is not limited to withdrawal of standard amounts such as a cup, etc., but may dispense as little or as much as desired without variation in the strength of the brewed beverage. There is essentially no wastage of the brewed beverage. There is no requirement for a storage tank with attendant staleness of the beverage. In fact, the beverage never contacts the dispenser at all, and therefore the requirement for washing, flushing, and internal cleaning of the dispenser is minimized. Operation of the apparatus is simple and efficient. These advantages enhance the value of the dispenser in both domestic and commercial applications.

Other reservoirs and associated feed mechanisms may be incorporated in the dispenser to provide additional flavoring elements when desired. Thus, cream and sugar reservoirs might be included, and by simple adaptation of the described embodiment, these ingredients might be included at will in coffee dispensed by the apparatus. Solid flavoring substances will, of course, be of the flowable type, and the term "powder" as used herein refers to such material, whether it be extremely fine like powdered coffee or coarse like granulated sugar, as long as the particles are small enough to provide a substantially continuous type of dispensing action.

While we have shown and described a particular embodiment of our invention we do not desire the invention to be limited to the particular construction disclosed, and we intend by the appended claims to cover all modifications within the true scope and spirit of our invention.

What we claim as new and desire to secure by Letters Patent of the United States:

1. A beverage dispenser comprising a first reservoir for liquid material, a second reservoir for powdered material soluble in said liquid, a liquid feed mechanism connected with said first reservoir, said liquid feed mechanism including a first valve, a tube connecting said first valve to said first reservoir whereby said liquid may flow by gravity through said tube and said first valve, constricting means in said tube for limiting the rate of flow of liquid therethrough, means positioning said constricting means in accordance with the level of said liquid in said reservoir whereby the head above said constricting means is substantially constant and the flow of liquid from said first valve is substantially independent of the height of said liquid in said first reservoir, said liquid feed mechanism also including a first outlet means for delivering said liquid from said first valve, a powder feed mechanism connected to said second reservoir and having a second outlet means substantially adjacent said first outlet means whereby liquid and powder flowing from said feed mechanisms may descend by gravity into a common receptacle, said powder feed mechanism including means for delivering powder to said receptacle substantially continuously at a constant rate, and manually actuated for opening said first valve and operating said powder feed mechanism concurrently, whereby the strength of the beverage delivered to said receptable is independent of the amount dispensed at any given time and independent of the amounts of the contents of said reservoirs.

2. A beverage dispenser comprising a first reservoir for storing liquid material at atmospheric pressure, a second reservoir for powdered material, first and second feed mechanisms connected to said first and second reservoirs respectively, said first feed mechanism including gravity flow means for delivering material stored in said first reservoir to a receptacle supplied by the user, said second feed mechanism including means for delivering material from said second reservoir to said receptacle, manually actuated means for operating said first and second feed mechanisms concurrently, flow control means associated with said first feed mechanism for maintaining a fixed rate of delivery from said first reservoir to said receptable irrespective of the liquid level in said first reservoir, and manually operable means for varying the rate of delivery of said second feed mechanism, whereby a beverage of preselected uniform strength may be prepared in said receptacle.

3. A beverage dispenser comprising a first reservoir for liquid material, a second reservoir for powdered material, a first feed mechanism connected to said first reservoir including a tube for delivering liquid to a receptacle supplied by the user, a second feed mechanism connected to said second reservoir including wall means for delivering powdered material to said receptacle, means for imparting vibratory movement of constant amplitude to said wall means, manually actuated means for operating said first and second feed mechanisms concurrently, and flow control means associated with said first feed mechanism for maintaining a fixed rate of delivery from said first reservoir to said receptacle irrespective of the liquid level in said first reservoir, whereby a beverage of uniform strength may be prepared in said receptacle.

4. A beverage dispenser comprising a first reservoir for liquid material, a second reservoir for powdered material, a first feed mechanism connected to said first reservoir including a tube for delivering liquid to a receptacle supplied by the user, a second feed mechanism connected to said second reservoir including wall means for delivering powdered material to said receptacle, means for imparting vibratory movement of constant amplitude within a predetermined amplitude range to said wall means, manually operable means for selectively setting said contant amplitude, manually actuated means for operating said first and second feed mechanisms concurrently, and flow control means associated with said first feed mechanism for maintaining a fixed rate of delivery from said first reservoir to said receptacle irrespective of the liquid level in said first reservoir, whereby a beverage of preselected uniform strength may be prepared in said receptacle.

5. A beverage dispenser as defined in claim 1 in which said powder feed mechanism includes vibratory means for causing said powder to flow toward said second outlet and a gate closing said outlet, and said manually actuated means includes means for energizing said vibratory means and open said gate.

6. A beverage dispenser as defined in claim 5 including manually operable means for varying the amplitude of vibration of said vibratory means, whereby the strength of the dispensed beverage may be set at various preselected levels.

7. A beverage dispenser as defined in claim 5 in which said vibratory means includes an electrically powered vibrator and manually variable means for supplying a preselected voltage to said vibrator whereby the strength of the dispensed beverage may be set at various preselected levels.

References Cited in the file of this patent

UNITED STATES PATENTS

| | | |
|---|---|---|
| 2,533,930 | Harr | Dec. 12, 1950 |
| 2,802,599 | Callahan et al. | Aug. 13, 1957 |
| 2,822,112 | Bremer | Feb. 4, 1958 |